US006647118B1

(12) United States Patent
Miura et al.

(10) Patent No.: US 6,647,118 B1
(45) Date of Patent: Nov. 11, 2003

(54) NOISE CANCELING MICROPHONE UNIT FOR COMPOSING NOISE CANCELING HANDSET BY USING NORMAL HOUSING

(75) Inventors: Shinsuke Miura, Kawasaki (JP); Eiichi Taniguchi, Kawasaki (JP)

(73) Assignee: NEC Infrontia Corporation, Kawasaki (JP)

( * ) Notice: Subject to any disclaimer, the term of this patent is extended or adjusted under 35 U.S.C. 154(b) by 494 days.

(21) Appl. No.: 09/624,674

(22) Filed: Jul. 24, 2000

(30) Foreign Application Priority Data

Jul. 27, 1999 (JP) .......................... 11-212615

(51) Int. Cl.[7] ............................................. H04M 1/00
(52) U.S. Cl. ................................................. 379/433.03
(58) Field of Search ....................... 379/433.03, 420.03; 381/357, 356

(56) References Cited

U.S. PATENT DOCUMENTS 4,463,222 A * 7/1984 Poradowski ............. 381/357

FOREIGN PATENT DOCUMENTS

EP 0493361 A2 * 12/1991 ............ 379/433.03

* cited by examiner

Primary Examiner—Jack Chiang
(74) Attorney, Agent, or Firm—Michael Best & Friedrich LLC

(57) ABSTRACT

A noise canceling microphone unit composes a noise canceling handset by the use of a normal housing for a normal handset. The unit comprises a noise canceling microphone element having first and second sound sensing surface, a microphone holder having a hollow cylinder and a vent tube, and a circuit board. The hollow cylinder has opposite first and second open ends and holds the microphone element so that the first sound sensing surface is directed to but short of the first open end while the second sound sensing surface is directed to but short of the second open end. The hollow cylinder is mounted in the housing so that the first open end faces a mouthpiece surface of the housing. The circuit board closes the second open end. The vent tube is opened in the hollow cylinder at a side of the second open end and opened to the outside of the housing through a side surface facing a different direction from the direction that the mouthpiece surface faces.

20 Claims, 3 Drawing Sheets

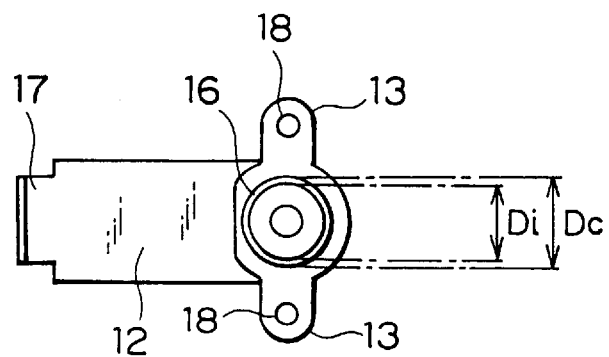
FIG. 1B
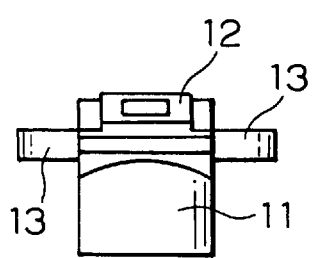
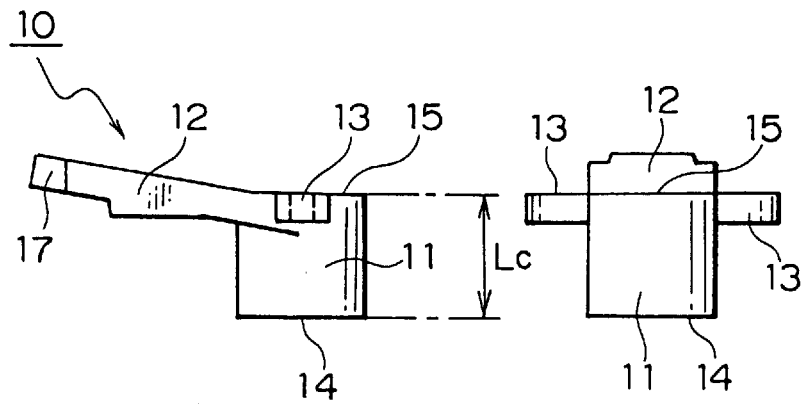
FIG. 1D  FIG. 1A  FIG. 1E
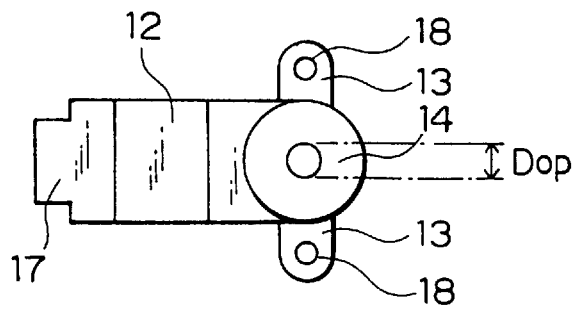
FIG. 1C

NOISE CANCELING MICROPHONE UNIT FOR COMPOSING NOISE CANCELING HANDSET BY USING NORMAL HOUSING

BACKGROUND OF THE INVENTION

This invention relates to a noise canceling handset, particularly, relates to a noise canceling microphone unit that is used for composing a noise canceling handset by the use of a normal housing for a normal handset.

A conventional telephone set has a handset. The handset comprises a closed housing which usually composed of an upper case and a lower case assembled to each other to define a closed space therein. The closed space has a microphone receiving space portion and an earphone receiving space potions. The closed housing or the lower case has a mouthpiece surface at a portion corresponding to the microphone receiving space portion. A user speaks his message towards the mouthpiece surface through which the speech sound is transmitted to the microphone mounted in the microphone receiving space portion. Therefore, the microphone surface has usually vent holes for permitting the sound to transfer through the mouthpiece surface. Therefore, not only the speech sound but also surrounding sound transfer through the mouthpiece surface to reach the microphone.

In some handsets, speech can be picked up with surrounding noises being canceled. Such handsets are called noise canceling handsets.

A conventional noise canceling handset comprises a noise canceling microphone element that has first and second acousto-electric transducers (i.e. microphones) fixed to each other back to back. That is, the noise canceling microphone element has first and second sound sensing surfaces at the opposite ends. The acousto-electric transducers are, for example, condenser microphones. Different sounds incoming to the first and second sensing surfaces are converted into electric signals by the two acousto-electric transducers, respectively. Those electric signals are subtracted to each other to form a resultant electric signal, which represents a sound pressure difference between sounds sensed at the first and the second sound sensing surfaces. The resultant electric signal represents the speech directed to the mouthpiece surface but without the surrounding noise, because the surrounding noise is cancelled since it is sensed at both of the first and second sensing surfaces.

However, the closed housing of the handset used for containing the noise canceling microphone element has a special structure where the closed housing has a side surface directing in a direction different from the mouthpiece surface. The first acousto-electric transducer and the second acousto-electric transducer are mounted in the closed housing to face the mouthpiece surface and the side surface, respectively. With this structure, the surrounding noises are sensed by both of the first and the second acousto-electric transducers and the voice is mainly sensed by the first acousto-electric transducer.

The first and the second acousto-electric transducers are actuated by sound waves and produce essentially equivalent electric waves as first and second signals, respectively. The noise canceling microphone element produces an electric difference signal representative of a difference between the first signal and the second signal. As mentioned above, the first and the second acousto-electric transducers similarly pick up surrounding noises and the first acousto-electric transducer further picks up the voice while the second acousto-electric transducer hardly picks up the voice. Accordingly, the difference signal produced by the noise canceling microphone element substantially represents the voice without noises.

By the way, it is necessary for manufacture of the special housing to use special metallic molds. That is why the special housing has an opening in the side surface and has a vent tube from the opening to the second acousto-electric transducer. The vent tube leads the noises to the second transducer and prevents sound from reaching from an earphone through the housing.

Therefore, the special metallic molds are necessary to manufacture the special housing of the noise canceling handset. This means that big investment in plant and equipment is necessary when manufacture of the noise-canceling handset is started.

SUMMARY OF THE INVENTION

It is therefore an object of this invention to provide a noise canceling microphone unit for composing a noise canceling handset by the use of a normal housing for a normal handset.

It is another object of this invention to provide a microphone holder for substituting a normal housing of a normal handset for a special housing of a noise canceling handset.

It is still another object of this invention to provide a noise canceling handset which has a normal housing for a normal handset.

It is yet another object of this invention to provide a noise canceling handset which is inexpensive.

It is further still another object of this invention to provide a method of mounting a noise canceling microphone in a normal housing for a normal handset.

Other object of this invention will become clear as the description proceeds.

According to a first gist of this invention, a noise canceling microphone unit is for use in a handset having a closed housing defining a microphone receiving space therein. The housing has a mouthpiece surface and a side surface. The noise canceling microphone unit is mounted in the microphone receiving space and comprises a noise canceling microphone element having first and second sound sensing surfaces at opposite ends thereof to produce an electric signal representing a sound difference between a first sound sensed at the first sound sensing surface and a second sound sensed at the second sound sensing surface. A microphone holder fixedly holds the noise canceling microphone element therein. The microphone holder comprises a hollow cylinder having opposite first and second open ends. The first open end faces the mouthpiece surface when the microphone holder is mounted in the microphone receiving space. The hollow cylinder fixedly holds therein the noise canceling microphone element with the first sound sensing surface being directed to but short of the first open end while the second sound sensing surface directed to but short of the second open end. A vent tube laterally extends from the hollow cylinder and opens in the hollow cylinder at a position between the second open end and the second sound sensing surface of the noise canceling microphone element held in the hollow cylinder. The vent tube has an extending open end. The extending open end is opened to the outside of the housing through the side surface when the microphone holder is mounted in the microphone receiving space. A circuit board is connected to the noise canceling microphone element and mounted on the hollow cylinder to close the second open end.

According to a second gist of this invention, a microphone holder is for use in a handset to hold a noise canceling microphone element having a microphone length. The microphone holder comprises a hollow cylinder which has a peripheral surface between a first open end and a second open end and a cylinder length longer than the microphone length for defining an inner space to receive the noise canceling microphone. A vent tube is formed on the peripheral surface at a position which is nearer to the second open end than the noise canceling microphone received in the inner space. The vent tube extends outward to an extending open end and defines a passage which leads form the extending open end to the inner space.

According to a third gist of this invention, a microphone holder fixedly holds a noise canceling microphone element in a handset having a closed housing defining a microphone receiving space therein. The housing has a mouthpiece surface and a side surface. The noise canceling microphone element has first and second sound sensing surfaces at opposite ends thereof to produce an electric signal representing a sound difference between a first sound sensed at said first sound sensing surface and a second sound sensed at said second sound sensing surface. The microphone holder comprises a hollow cylinder having opposite first and second open ends. The first open end faces the mouthpiece surface when the microphone holder is mounted in the microphone receiving space. The hollow cylinder fixedly holds therein the noise canceling microphone element with the first sound sensing surface being directed to but short of the first open end while the second sound sensing surface directed to but short of said second open end. A vent tube laterally extends from the hollow cylinder and opens in the hollow cylinder at a position between the second open end and the second sound sensing surface when the noise canceling microphone element is held in the hollow cylinder. The vent tube has an extending open end so that the extending open end is opened to the outside of the housing through the side surface when the microphone holder is mounted in the microphone receiving space.

According to a fourth gist of this invention, a noise canceling handset includes a noise canceling microphone element having a microphone length. The noise canceling handset comprises a microphone holder for holding the noise canceling microphone element. The microphone holder comprises a hollow cylinder having a peripheral surface between a first open end and a second open end and a cylinder length longer than the microphone length for defining an inner space to receive the noise canceling microphone element. A vent tube is formed on the peripheral surface at a position which is nearer to the second open end than the noise canceling microphone received in the inner space. The vent tube extends outward to an extending open end and defining a passage which leads from the extending open end to the inner pace. A housing has a mouthpiece surface and a side surface for defining a microphone receiving space to receive the noise canceling microphone element held by the microphone holder. The microphone holder is fixed to the housing at the microphone receiving space so that the first open end faces said mouthpiece surface and that said extending open end is opened to the outside of said housing through said side surface.

According to a fifth gist of this invention, a noise canceling handset has a closed housing defining a microphone receiving space therein. The housing has a mouthpiece surface and a side surface. The noise canceling handset comprises a noise canceling microphone element having first and second sound sensing surfaces at opposite ends thereof to produce an electric signal representing a sound difference between a first sound sensed at the first sound sensing surface and a second sound sensed at the second sound sensing surface. A microphone holder fixedly holds the noise canceling microphone element therein. The microphone holder is mounted in the microphone receiving space and comprises a hollow cylinder having opposite first and second open ends. The first open end faces the mouthpiece when the microphone holder is mounted in the microphone receiving space. The hollow cylinder fixedly holds therein the noise canceling microphone element with said first sound sensing surface being directed to but short of said first open end while said second sound sensing surface directed to but short of the second open end. A vent tube laterally extends from the hollow cylinder and opens in the hollow cylinder at a position between the second open end and the second sound sensing surface of the noise canceling microphone element held in the hollow cylinder. The vent tube has an extending open end. The extending open end is opened to the outside of said housing through the side surface when the microphone holder is mounted in the microphone receiving space. A circuit board is connected to the noise canceling microphone element and mounted on the hollow cylinder to close the second open end.

According to a sixth gist of this invention, a method of mounting a noise canceling microphone element in a microphone receiving space defined by a closed housing of a handset is provided. The noise canceling microphone element has first and second sound sensing surfaces at opposite ends thereof to produce an electric signal representing a sound difference between a first sound sensed at the first sound sensing surface and a second sound sensed at the second sound sensing surface. The housing has a lower member with a mouthpiece surface and an upper member with a side surface. The method comprises the steps of preparing a microphone holder for fixedly holding said noise canceling microphone element therein. The microphone holder comprises a hollow cylinder having opposite first and second open ends for fixedly holding therein the noise canceling microphone element. A vent tube laterally extends from the hollow cylinder and opening in the hollow cylinder at a position between the second open end and the second sound sensing surface when the noise canceling microphone element is held in the hollow cylinder. The vent tube has an extending open end so that the extending open end is opened to the outside of the housing through the side surface when the microphone holder is mounted in the microphone receiving space. The method further comprises the steps of holding the noise canceling microphone element in the microphone holder with the first sound sensing surface being directed to but short of the first open end while the second sound sensing surface directed to but short of the second open end so that a circuit board connected to said noise canceling microphone element is mounted on said hollow cylinder and closes the second open end, mounting the microphone holder together with the noise canceling microphone held by the microphone holder in the microphone receiving space on side of the lower member so that the first open end faces the mouthpiece when the microphone holder is mounted in the microphone receiving space, fixing the microphone holder together with the circuit board to the lower member, making an opening in the side surface so as to correspond to the extending open end of the vent tube of the microphone holder fixed to the lower member, and combining the upper member with the lower member so that the extending opening end is inserted into the opening.

BRIEF DESCRIPTION OF THE DRAWING

FIG. 1A is a side view of a microphone holder according to a preferred embodiment of this invention;

FIG. 1B is a plane view of the microphone holder of FIG. 1A;

FIG. 1C is a bottom view of the microphone holder of FIG. 1A;

FIG. 1D is a front view of the microphone holder of FIG. 1A;

FIG. 1E is a back view of the microphone holder of FIG. 1A;

DESCRIPTION OF THE PREFERRED EMBODIMENT

Figure 2:
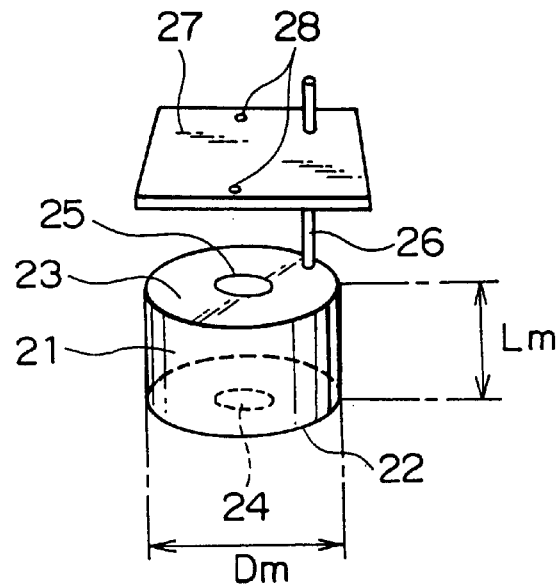
FIG. 2 is a perspective view of a noise canceling microphone element, which is held by the microphone holder of FIGS. 1A–1E, with a circuit board.

Referring to FIGS. 1A–1E, description will be made about a microphone holder according to a preferred embodiment of this invention. As mentioned after, the microphone holder fixedly holds a noise canceling microphone element (see FIG. 2) therein. The microphone holder holding the noise canceling microphone composes a noise canceling microphone unit together with a circuit board. Moreover, the noise canceling microphone unit is mounted in a microphone receiving space of a housing for a noise canceling handset (see FIGS. 3 and 4).

In FIGS. 1A–1E, the microphone holder 10 comprises a hollow cylinder 11, a vent tube 12, and a pair of projections 13.

The hollow cylinder 11 has opposite first and second open ends 14, 15, a peripheral surface with a cylinder length Lc extending between the first and the second open ends 14, 15, and an inner surface defining an inner space and having a cylinder inner diameter Dc. The cylinder length Lc is longer than a microphone length Lm (see FIG. 2) of the noise canceling microphone element. The cylinder inner diameter Dc is equal to or slightly larger than a microphone diameter Dm (see FIG. 2) of the noise canceling microphone element. The first open end 14 has an opening diameter Dop smaller than both of the cylinder inner diameter Dc and the microphone diameter Dm. The hollow cylinder 11 further has a projecting ring 16 projecting into the inner space from the inner surface at almost middle between the first and the second open ends 14, 15. The projecting ring 16 has an inside diameter Di slightly smaller than the microphone diameter Dm.

The vent tube 12 laterally extends from hollow cylinder 11 and opens in the hollow cylinder 11 at a position between the second open end 15 and the top of the noise canceling microphone element held in the hollow cylinder 11. In other words, the vent tube 12 is formed near the second open end 15 on the peripheral surface of the hollow cylinder 11 and radially extends with an inclination. The vent tube 12 has an extending open end 17 and a passage, which has a rectangular cross section, from the extending open end to the inside space of the hollow cylinder 11.

The projections 13 are formed on the peripheral surface of the hollow cylinder 11 at opposite sides near the second open end 15. The projections 13 are partially on the vent tube 12. Each of the projections 13 has a screw-hole 18 to receive a fixing screw (see FIGS. 3 and 4), which fixes the hollow cylinder 11 to the housing.

The hollow cylinder 11, the vent tube 12 and projections 13 are, for example, made of synthetic rubber, which is a low price, and formed in one piece.

Referring to FIG. 2, the noise canceling microphone element 21 has a solid cylindrical shape with the microphone length (or height) Lm and with the microphone diameter Dm. In addition, the noise canceling microphone element 21 has first and second sound sensing surfaces 22, 23 at the opposite ends. The first and the second sensing surfaces 22, 23 have first and second sensing holes 24, 25, respectively. The noise canceling microphone element 21 contains first and second microphones (not shown) that are fixed to each other back to back. The first and the second sound sensing surfaces 22, 23 are corresponding to the first and second microphones, respectively.

The first microphone is actuated by first sound waves passing through the first sensing hole 24 and produces a first signal representative of the first sound waves. Similarly, the second microphone is actuated by second sound waves passing through the second sensing hole 25 and produces second signal representative of the second sound waves. The noise canceling microphone element 21 produces an electric difference signal which represents a difference between the fist signal and the second signal. In other words, the electric difference signal represents a sound difference between the first sound waves sensed at the first sound sensing surface 22 and the second sound waves sensed at the second sensing surface 23.

A prop 26 is fixed to the noise canceling microphone element 21 at the second sensing surface 23 and supports a circuit board 27 so that the circuit board 27 is apart from the noise canceling microphone element 21.

The circuit board 27 mounts with a signal processing circuit (not shown) that is electrically connected to the noise canceling microphone element 21. The signal processing circuit includes, for example, an amplifier for amplifying the electric difference signal from the noise canceling microphone element 21. Moreover, the circuit board 27 has a pair of screw-holes 28 corresponding to the screw-holes 18 of the microphone holder 10.

Figure 3:
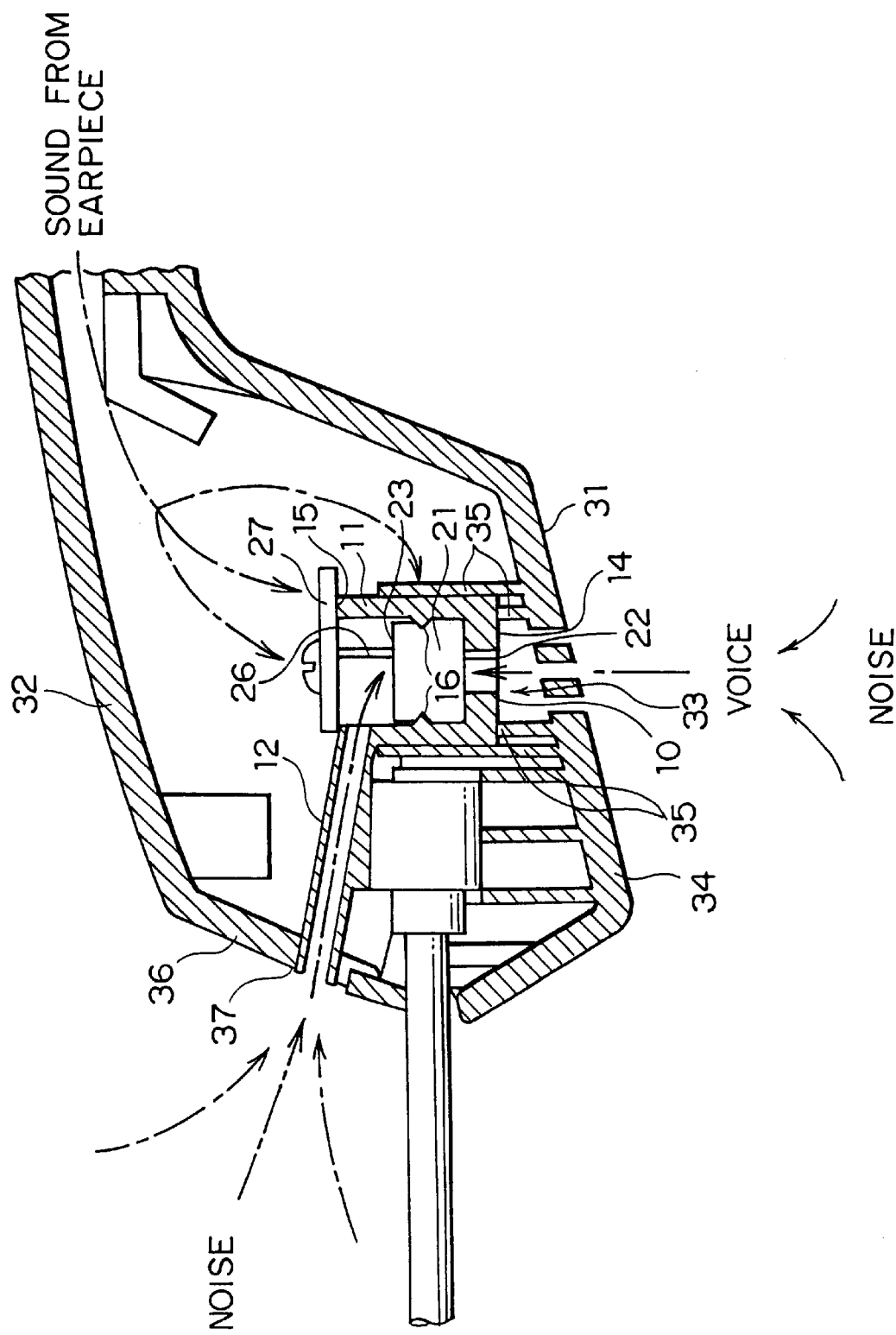
FIG. 3 is a partial sectional view of a noise canceling handset including upper and lower member of a housing and the microphone holder of FIGS. 1A–1E with the noise canceling microphone element of FIG. 2.

As illustrated in FIG. 3, the noise canceling microphone element 21 is inserted into the inner space of the hollow cylinder 11 so that the first sound sensing surface 22 is directed to but short of the first open end 14 while the second sound sensing surface 23 is directed to but short of the second open end 15 and that the circuit board 27 is mounted on the hollow cylinder 11 and closes the second open end 15. The projecting ring 16 press the noise canceling microphone element 21 inserted in the hollow cylinder 11 from peripheral directions with the elasticity. Consequently, the microphone holder 10 fixedly holds the noise canceling microphone element 21. Additionally, the vent tube 12 opens in the hollow cylinder 11 at the position above the second sound surface 23. That is, the second sensing surface 23 is below when the noise canceling microphone element 21 is held by the microphone holder 10.

The housing of the noise canceling handset comprises a lower member 31 and an upper member 32 to form a microphone receiving space 33 for receiving the noise canceling microphone unit therein.

The lower member 31 has a mouthpiece surface 34 facing a first direction and protrusions 35 formed on the mouthpiece surface 34. The protrusions 35 define the microphone receiving space 33.

The upper member 32 has a side surface 36 facing a second direction, which is different from the first direction, with an opening 37 at the position that corresponds to the extending open end 17 of the microphone holder 10. The opening 37 is made by, for example, partially removing or cutting out an upper member of a normal housing for a normal handset. It is easy and inexpensive to make the upper member 32 because special metallic molds are unnecessary to manufacture the upper member 32.

The microphone holder 10 is mounted in the microphone receiving space 33 so that the first open end 14 faces the mouthpiece surface 33.

Figure 4:
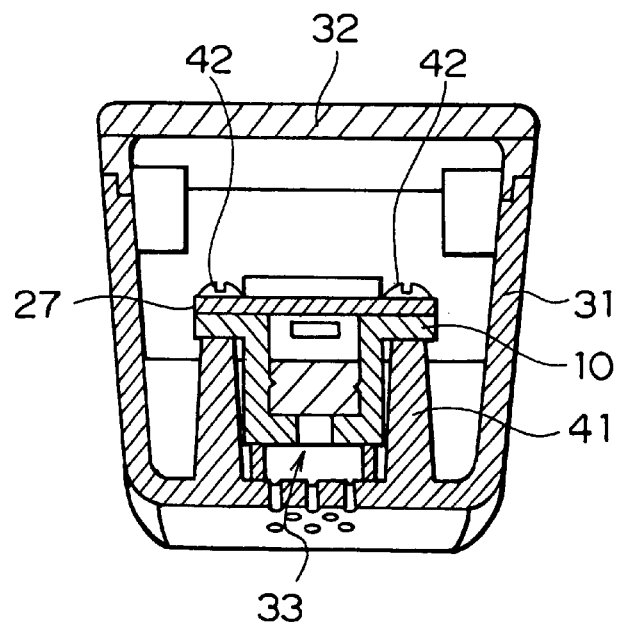
FIG. 4 is a sectional view of the noise canceling handset sectioned at a line A—A of FIG. 3.

Referring to FIG. 4, the lower member 31 has pedestals 41 beside the microphone receiving space 35 to fix the microphone holder 10 together with the circuit board 27 when the noise canceling microphone unit is mounted in the microphone receiving space 35.

As shown in FIGS. 3 and 4, the microphone holder 10 and the circuit board 27 are screwed by a pair of fixing screws 42 on the pedestals 41 of the lower member 31. Then the upper member 32 is combined with the lower member 31 so that the extending open end 17 of the microphone holder 10 is inserted in the opening 37. Consequently, the extending open end 17 is opened to the outside of the housing through the side surface 36.

With this structure, surrounding noises reach the first sound sensing surface 22 through the mouthpiece surface 34 and the first open end 14. The surrounding noises also reach the second sound sensing surface 23 through the vent tube 12. In addition, voice of a telephoner reaches the first sound sensing surface 22 through the mouthpiece surface 34 and the first open end 14. The voice of the telephoner is difficult to reach the second sound sensing surface 23. This is because the opening 37 is formed in the side surface 36 facing the second direction different from the first direction that the mouthpiece surface 34 faces and because the vent tube 12 extends to the opening 37 so as to gradually leave form the mouthpiece surface 33.

Additionally, sound come from an earpiece (not shown) of the noise canceling handset through the inside of the housing reaches neither the first sound sensing surface 22 nor the second sound sensing surface 23. This is because the protrusions 35, the microphone holder 10, and the circuit board 27 prevent the sound from traveling to the first and the second sound sensing surface 22, 23. Accordingly, it is unnecessary for the housing to provide a structure (or parts) for blocking transmission of the sound come from the earpiece. That is, the lower member 31 and the upper member 32 are simple in structure.

Therefore, the first sound sensing surface 22 senses both of the noises and the voice while the second sensing surface 22 senses the noises without the voice. Then the noise canceling microphone element 21 produces an electric differential signal practically representing the voice without the noises. The signal processing circuit mounted on the circuit board 25 amplifies and transmits the differential signal to a telephone exchange (not shown).

While this invention has thus for been described in conjunction with the preferred embodiment thereof, it will readily be possible for those skilled in the art to put this invention into practice in various other manners. For example, the upper member 32 may be made by modified metallic molds that are made by modifying metallic molds for forming the normal upper member of the normal housing for the normal handset.

What is claimed is:

1. A noise canceling microphone unit for use in a handset having a closed housing defining a microphone receiving space therein, said housing having a lower member with a mouthpiece surface and an upper member with a side surface, said noise canceling microphone unit being mounted in said microphone receiving space and comprising:

a noise canceling microphone element having first and second acousto-electric transducers facing first and second sound sensing surfaces, respectively, at opposite ends of said noise canceling microphone element to produce an electric signal representing a sound difference between a first sound sensed at said first sound sensing surface and a second sound sensed at said second sound sensing surface;

a microphone holder for fixedly holding said noise canceling microphone element therein, said microphone holder comprising:

a hollow cylinder having opposite first and second open ends, said first open end facing said mouthpiece surface when said microphone holder is mounted in said microphone receiving space, said hollow cylinder fixedly holding therein said noise canceling microphone element with said first sound sensing surface being directed to but short of said first open end while said second sound sensing surface directed to but short of said second open end; and a vent tube laterally extending from said hollow cylinder and opening in said hollow cylinder at a position between said second open end and said second sound sensing surface of said noise canceling microphone element held in said hollow cylinder, said vent tube having an extending open end, said extending open end being inserted into an opening formed in said side surface to be opened to the outside of said housing when said microphone holder is mounted on said lower member in said microphone receiving space; and a circuit board connected to said noise canceling microphone element and mounted on said hollow cylinder to close said second open end.

2. A noise canceling microphone unit as claimed in claim 1, wherein said noise canceling microphone element has a microphone length extending between said first and said second sound sensing surfaces, and said hollow cylinder has a cylinder length longer than said microphone length.

3. A noise canceling microphone unit as claimed in claim 1, wherein said noise canceling microphone element has a microphone diameter, said hollow cylinder has a cylinder inner diameter equal to or slightly larger than said microphone diameter, and said first open end having an opening diameter smaller than said microphone diameter.

4. A microphone holder for use in a handset having a housing with both of a lower member and an upper member to hold a noise canceling microphone element having a microphone length, said noise canceling microphone element having first and second acousto-electric transducers facing first and second sound sensing surfaces at opposite ends thereof to produce an electric signal representing a sound difference between a first sound sensed at said first sound sensing surface and a second sound sensed at said second sound sensing surface, said microphone holder comprising:

a hollow cylinder having a peripheral surface between a first open end and a second open end and a cylinder length longer than said microphone length for defining an inner space to receive said noise canceling microphone element, and a vent tube formed on said peripheral surface at a position which is nearer to said second open end than said noise canceling microphone received in said inner space, said vent tube extending outward to an extending open end and defining a passage which leads from said extending open end to said inner space; wherein said extending open end is inserted into an opening of said upper housing member when said hollow cylinder is mounted on said lower housing member.

5. A microphone holder as claimed in claim 4, said noise canceling microphone element having a microphone diameter, wherein said hollow cylinder has a cylinder inner diameter equal to or slightly larger than said microphone diameter, and said first open end having a opening diameter smaller than said microphone diameter.

6. A microphone holder as claimed in claim 4, wherein said hollow cylinder and said vent tube are made of synthetic rubber.

7. A microphone holder as claimed in claim 6, wherein said hollow cylinder and said vent tube are formed in one piece.

8. A microphone holder as claimed in claim 4, wherein said microphone holder further comprises a projection formed on said peripheral surface and having a screw hole.

9. A microphone holder for fixedly holding a noise canceling microphone element in a handset having a closed housing defining a microphone receiving space therein, said housing having a lower member with a mouthpiece surface and an upper member with a side surface, said noise canceling microphone element having first and second acousto-electric transducers facing first and second sound sensing surfaces at opposite ends thereof to produce an electric signal representing a sound difference between a first sound sensed at said first sound sensing surface and a second sound sensed at said second sound sensing surface, said microphone holder comprising:

a hollow cylinder having opposite first and second open ends, said first open end facing said mouthpiece surface when said microphone holder is mounted in said microphone receiving space, said hollow cylinder for fixedly holding therein said noise canceling microphone element with said first sound sensing surface being directed to but short of said first open end while said second sound sensing surface directed to but short of said second open end; and a vent tube laterally extending from said hollow cylinder and opening in said hollow cylinder at a position between said second open end and said second sound sensing surface when said noise canceling microphone element is held in said hollow cylinder, said vent tube having an extending open end so that said extending open end is inserted into an opening formed in said side surface to be opened to the outside of said housing when said microphone holder is mounted on said lower member in said microphone receiving space.

10. A microphone holder as claimed in claim 9, said noise canceling microphone element having a microphone length extending between said first and said second sound sensing surfaces, wherein:

said hollow cylinder has a cylinder length longer than said microphone length.

11. A microphone holder as claimed in claim 9, said noise canceling microphone element having a microphone diameter, wherein:

said hollow cylinder has a cylinder inner diameter equal to or slightly larger than said microphone diameter, and said first open end having a opening diameter smaller than said microphone diameter.

12. A noise canceling handset including a noise canceling microphone element having a microphone length, said noise canceling microphone element having first and second acousto-electric transducers facing first and second sound sensing surfaces at opposite ends thereof to produce an electric signal representing a sound difference between a first sound sensed at said first sound sensing surface and a second sound sensed at said second sound sensing surface, said noise canceling handset comprising:

a microphone holder for holding said noise canceling microphone element, said microphone holder comprising:

a hollow cylinder having a peripheral surface between a first open end and a second open end and a cylinder length longer than said microphone length for defining an inner space to receive said noise canceling microphone element; and a vent tube formed on said peripheral surface at a position which is nearer to said second open end than said noise canceling microphone received in said inner space, said vent tube extending outward to an extending open end and defining a passage which leads from said extending open end to said inner space, and a housing having a lower member with a mouthpiece surface and an upper member with a side surface for defining a microphone receiving space to receive said noise canceling microphone element held by said microphone holder, wherein:

said microphone holder is fixed to said lower member at said microphone receiving space so that said first open end faces said mouthpiece surface and that said extending open end is inserted into an opening formed in said side surface to be opened to the outside of said housing.

13. A noise canceling handset as claimed in claim 12, wherein said noise canceling microphone element has a microphone diameter, said hollow cylinder has a cylinder inner diameter equal to or slightly larger than said microphone diameter, and said first open end has a opening diameter smaller than side microphone diameter.

14. A noise canceling handset as claimed in claim 12 wherein said noise canceling handset further comprises a circuit board mechanically connected to said noise canceling microphone element for closing said second open end when said noise canceling microphone element is received in said inner space.

15. A noise canceling handset as claimed in claim 14, wherein said circuit board is fixed by a screw together with said microphone holder to said housing at said microphone receiving space.

16. A noise canceling handset as claimed in claim 14, wherein said circuit board mounts with a signal processing circuit which is electrically connected to said noise canceling microphone element.

17. A noise canceling handset having a closed housing defining a microphone receiving space therein, said housing having a lower member with a mouthpiece surface of a lower member and a side surface of an upper member, said noise canceling handset comprising:

a noise canceling microphone element having first and second acousto-electric transducers facing first and second sound sensing surfaces, respectively, at opposite ends of said noise canceling microphone element to produce an electric signal representing a sound difference between a first sound sensed at said first sound sensing surface and a second sound sensed at said second sound sensing surface;

a microphone holder for fixedly holding said noise canceling microphone element therein, said microphone holder mounted in said microphone receiving space and comprising:

a hollow cylinder having opposite first and second open ends, said first open end facing said mouthpiece when said microphone holder is mounted in said microphone receiving space, said hollow cylinder fixedly holding therein said noise canceling microphone element with said first sound sensing surface being directed to but short of said first open end while said second sound sensing surface directed to but short of said second open end; and a vent tube laterally extending from said hollow cylinder and opening in said hollow cylinder at a position between said second open end and said second sound sensing surface of said noise canceling microphone element held in said hollow cylinder, said vent tube having an extending open end, said extending open end being inserted into an opening formed in said side surface to be opened to the outside of said housing when said microphone holder is mounted on said lower member in said microphone receiving space; and a circuit board connected to said noise canceling microphone element and mounted on said hollow cylinder to close said second open end.

18. A noise canceling handset as claimed in claim 17, wherein said noise canceling microphone element has a microphone length extending between said first and said second sound sensing surfaces, and said hollow cylinder has a cylinder length longer than said microphone length.

19. A noise canceling handset as claimed in claim 17, wherein said noise canceling microphone element has a microphone diameter, said hollow cylinder has a cylinder inner diameter equal to or slightly larger than said microphone diameter, and said first open end having a opening diameter smaller than said microphone diameter.

20. A method of mounting a noise canceling microphone element in a microphone receiving space defined by a closed housing of a handset, said noise canceling microphone element having first and second sound sensing surfaces at opposite ends thereof to produce an electric signal representing a sound difference between a first sound sensed at said first sound sensing surface and a second sound sensed at said second sound sensing surface, said housing having a lower member with a mouthpiece surface and an upper member with a side surface, said method comprising the steps of:

preparing a microphone holder for fixedly holding said noise canceling microphone element therein, said microphone holder comprising: a hollow cylinder having opposite first and second open ends for fixedly holding therein said noise canceling microphone element; and a vent tube laterally extending from said hollow cylinder and opening in said hollow cylinder at a position between said second open end and said second sound sensing surface when said noise canceling microphone element is held in said hollow cylinder, said vent tube having an extending open end so that said extending open end being opened to the outside of said housing through said side surface when said microphone holder is mounted in said microphone receiving space;

holding said noise canceling microphone element in said microphone holder with said first sound sensing surface being directed to but short of said first open end while said second sound sensing surface directed to but short of said second open end so that a circuit board connected to said noise canceling microphone element is mounted on said hollow cylinder and closes said second open end;

mounting said microphone holder together with said noise canceling microphone held by said microphone holder in said microphone receiving space on side of said lower member so that said first open end faces said mouthpiece when said microphone holder is mounted in said microphone receiving space, fixing said microphone holder together with said circuit board to said lower member;

making an opening in said side surface so as to correspond to said extending open end of said vent tube of said microphone holder fixed to said lower member; and combining said upper member with said lower member so that said extending opening end is inserted into said opening.

* * * * *